US011110355B2

United States Patent
Guinchard et al.

(10) Patent No.: US 11,110,355 B2
(45) Date of Patent: Sep. 7, 2021

(54) VIDEOGAME PERIPHERAL SECURITY SYSTEM AND METHOD

(71) Applicant: Activision Publishing, Inc., Santa Monica, CA (US)

(72) Inventors: Lee M. Guinchard, Livermore, CA (US); Timothy S. Clark, Moss Beach, CA (US); Michael Andrew Guy Nimmo, Leamington Spa (GB); Philip Hindle, Leamington Spa (GB)

(73) Assignee: Activision Publishing, Inc., Santa Monica, CA (US)

( * ) Notice: Subject to any disclaimer, the term of this patent is extended or adjusted under 35 U.S.C. 154(b) by 1323 days.

(21) Appl. No.: 14/862,960

(22) Filed: Sep. 23, 2015

(65) Prior Publication Data

US 2016/0367902 A1 Dec. 22, 2016

Related U.S. Application Data (60) Provisional application No. 62/182,348, filed on Jun. 19, 2015.

(51) Int. Cl.
*A63F 13/73* (2014.01)
*A63F 13/245* (2014.01)
*A63F 13/235* (2014.01)
*A63F 13/23* (2014.01)
*A63F 13/22* (2014.01)

(52) U.S. Cl.
CPC .............. *A63F 13/73* (2014.09); *A63F 13/22* (2014.09); *A63F 13/23* (2014.09); *A63F 13/235* (2014.09); *A63F 13/245* (2014.09)

(58) Field of Classification Search
CPC .......... A63F 13/72; A63F 13/22; A63F 13/23; A63F 13/235; A63F 13/245
See application file for complete search history.

(56) References Cited

U.S. PATENT DOCUMENTS

| | | | | |
|---|---|---|---|---|
| 6,225,547 | B1* | 5/2001 | Toyama | A63F 13/005 84/609 |
| 6,252,153 | B1* | 6/2001 | Toyama | G10H 1/0008 434/307 A |
| 6,353,174 | B1* | 3/2002 | Schmidt | G10H 1/0058 709/200 |
| 6,429,863 | B1* | 8/2002 | LoPiccolo | A63F 13/10 345/419 |
| 6,482,087 | B1* | 11/2002 | Egozy | A63F 13/12 463/7 |
| 6,905,413 | B1* | 6/2005 | Terao | G10H 1/0008 434/250 |

(Continued)

OTHER PUBLICATIONS

"Guitar Hero" for iPhone review of Jun. 7, 2010; webpage downloaded from www.replacementdocs.com, Jan. 5, 2021.*

*Primary Examiner* — Ronald Laneau
*Assistant Examiner* — Matthew D Hoel
(74) *Attorney, Agent, or Firm* — Klein, O'Neill & Singh, LLP (57) ABSTRACT

A system and method relating to a videogame system comprising videogame software and a videogame peripheral is presented. The presented system and method prevents against the use of certain videogame peripherals with unauthorized videogame software through the use of "protected" and "unprotected" inputs.

8 Claims, 5 Drawing Sheets

(56) References Cited

U.S. PATENT DOCUMENTS

| | | | | |
|---|---|---|---|---|
| 7,320,643 B1* | 1/2008 | Brosius | A63F 13/06 | 463/37 |
| 7,459,624 B2* | 12/2008 | Schmidt | G10H 1/342 | 84/477 R |
| 7,625,284 B2* | 12/2009 | Kay | A63F 13/10 | 463/31 |
| 7,758,427 B2* | 7/2010 | Egozy | A63F 13/358 | 463/42 |
| 8,079,901 B2* | 12/2011 | Brosius | A63F 13/06 | 463/7 |
| 8,079,907 B2* | 12/2011 | Egozy | A63F 13/54 | 463/42 |
| 8,371,940 B1* | 2/2013 | Robinson | A63F 13/843 | 463/39 |
| 8,439,733 B2* | 5/2013 | Kay | A63F 13/5375 | 463/7 |
| 8,444,464 B2* | 5/2013 | Boch | A63F 13/44 | 463/7 |
| 8,444,486 B2* | 5/2013 | Kay | A63F 13/10 | 463/31 |
| 8,449,360 B2* | 5/2013 | Stoddard | A63F 13/814 | 463/7 |
| 8,465,366 B2* | 6/2013 | Applewhite | A63F 13/847 | 463/36 |
| 8,550,908 B2* | 10/2013 | Booth | A63F 13/537 | 463/31 |
| 8,562,403 B2* | 10/2013 | Boch | A63F 13/52 | 463/7 |
| 8,568,234 B2* | 10/2013 | Dubrofsky | A63F 13/44 | 463/37 |
| 8,636,572 B2* | 1/2014 | Applewhite | A63F 13/44 | 463/7 |
| 8,663,013 B2* | 3/2014 | Egozy | A63F 13/46 | 463/42 |
| 8,678,895 B2* | 3/2014 | Teasdale | G10H 1/368 | 463/7 |
| 8,678,896 B2* | 3/2014 | Pitsch | G10H 3/146 | 463/7 |
| 8,690,670 B2* | 4/2014 | Kay | G10H 1/348 | 463/31 |
| 8,702,485 B2* | 4/2014 | Flury | A63F 13/54 | 463/7 |
| 8,777,744 B2* | 7/2014 | Basallo | A63F 13/00 | 463/35 |
| 8,874,243 B2* | 10/2014 | Bennett | A63F 13/10 | 700/92 |
| 9,278,286 B2* | 3/2016 | Bennett | A63F 13/10 | |
| 9,358,456 B1* | 6/2016 | Challinor | A63F 13/428 | |
| 9,704,350 B1* | 7/2017 | Rigopulos | G07F 17/3269 | |
| 9,842,577 B2* | 12/2017 | Brosius | A63F 13/814 | |
| 9,981,193 B2* | 5/2018 | Adams | G06K 9/00342 | |
| 9,987,557 B2* | 6/2018 | Garbowski | A63F 13/358 | |
| 10,102,836 B2* | 10/2018 | Mintz | A63F 3/00643 | |
| 10,220,303 B1* | 3/2019 | Schmidt | A63F 13/814 | |
| 10,357,714 B2* | 7/2019 | Challinor | G06F 3/017 | |
| 10,421,013 B2* | 9/2019 | Challinor | G06F 3/017 | |
| 2005/0215319 A1 | 9/2005 | Rigopulos | A63F 13/213 | 463/32 |
| 2006/0058101 A1* | 3/2006 | Rigopulos | A63F 13/10 | 463/35 |
| 2008/0113698 A1* | 5/2008 | Egozy | A63F 13/44 | 463/7 |
| 2008/0113797 A1* | 5/2008 | Egozy | A63F 13/814 | 463/35 |
| 2009/0165632 A1* | 7/2009 | Rigopulos | A63F 13/00 | 84/609 |
| 2010/0009750 A1* | 1/2010 | Egozy | A63F 13/005 | 463/35 |
| 2010/0029386 A1* | 2/2010 | Pitsch | G10H 1/348 | 463/35 |
| 2010/0041477 A1* | 2/2010 | Kay | G10H 1/368 | 463/31 |
| 2010/0304810 A1* | 12/2010 | Stoddard | A63F 13/814 | 463/7 |
| 2010/0304811 A1* | 12/2010 | Schmidt | A63F 13/814 | 463/7 |
| 2010/0304812 A1* | 12/2010 | Stoddard | A63F 13/46 | 463/7 |
| 2010/0304863 A1* | 12/2010 | Applewhite | G10H 1/0058 | 463/36 |
| 2010/0304865 A1* | 12/2010 | Picunko | A63F 13/814 | 463/37 |
| 2011/0256929 A1* | 10/2011 | Dubrofsky | A63F 13/21 | 463/37 |
| 2011/0257771 A1* | 10/2011 | Bennett | A63F 13/245 | 700/92 |
| 2011/0312397 A1* | 12/2011 | Applewhite | A63F 13/814 | 463/7 |
| 2011/0312415 A1* | 12/2011 | Booth | A63F 13/245 | 463/31 |
| 2012/0094730 A1* | 4/2012 | Egozy | A63F 13/814 | 463/7 |

* cited by examiner

VIDEOGAME PERIPHERAL SECURITY SYSTEM AND METHOD

CROSS REFERENCE TO RELATED APPLICATIONS

This application claims the benefit of the filing date of U.S. Provisional Patent Application No. 62/182,348, filed on Jun. 19, 2015, the disclosure of which is incorporated by reference herein.

FIELD OF THE INVENTION

The invention relates generally to videogames, and more particularly to systems and methods that prevent against the use of certain videogame peripherals with unauthorized videogame software through the use of "protected" and "unprotected" inputs.

BACKGROUND OF THE INVENTION

Videogames provide a source of entertainment for many people. Videogames provide an interactive experience for a user, an experience that can be both interesting and challenging. Videogames may provide users the opportunity to engage in activities otherwise unavailable to them or activities which may, except through the simplification provided by videogames, otherwise require extensive training or practice. Videogames may also provide for increasing levels of difficulty, allowing for growth of user capabilities.

Users typically interact with videogames using one or more videogame peripherals (also referred to herein as "peripherals"). Videogame peripherals may be used to obtain an input (e.g., direct input, measured input, etc.) from a user. Videogame peripherals may include, without limitation, a game controller, a gamepad, a keyboard, a mouse, an imaging device such as a camera, a motion sensing device, a light sensor, a biometric sensor, a virtual reality headset, and/or other devices that can obtain an input from a user. Certain videogames have peripherals specifically designed for the game. One example of such videogames is the music videogame, which sometimes employs musical instrument peripherals and/or peripherals resembling musical instruments. Music videogames include Activision Publishing, Inc.'s Guitar Hero and DJ Hero franchises, Harmonix Music Systems, Inc.'s Rock Band franchise, and Ubisoft Entertainment's Just Dance franchise. Other examples of videogames having peripherals specifically designed for the game include racing games with steering wheel peripherals, sports games with sports equipment peripherals, and hunting or combat games with firearm peripherals.

Videogame companies often invest significant resources in designing and manufacturing videogame peripherals to ensure they work optimally with a particular videogame and deliver a desirable user experience. Accordingly, videogame companies may have an interest in preventing use of their peripherals with unauthorized videogame software or systems that do not offer a satisfactory quality of gameplay or user experience. Likewise, videogame companies may design videogame software to work with a particular peripheral and may have an interest in preventing use of the videogame software with unauthorized peripherals not meeting expected quality or user experience levels.

SUMMARY OF THE INVENTION

The invention relates generally to videogames, and more particularly to systems and methods that prevent against the use of certain videogame peripherals with unauthorized videogame software through the use of "protected" and "unprotected" inputs.

One aspect of the invention relates to a videogame system comprising videogame software executing on a videogame console and a peripheral coupled to the videogame console. The peripheral comprises one or more protected inputs and one or more unprotected inputs. The protected and unprotected inputs may be comprised of any input(s) found on the peripheral, for example, gamepad buttons, joystick or analog stick inputs, action buttons, start/select buttons, trigger buttons, touchpads, keyboard keys, steering wheels, strum bars, whammy bars, drum pad inputs, etc. Note the term "input" as used herein encompasses any single input or any plurality of inputs actuated in combination or in sequence. For example, actuating a plurality of buttons simultaneously or in a particular sequence may be considered an "input."

The protected inputs are, by default, disabled until the peripheral receives an unlocking message from the videogame console, while the unprotected inputs are enabled by default. In one embodiment, the protected inputs are inputs only used during gameplay of the videogame software, while the unprotected inputs can be used both within and outside gameplay, for example, to navigate videogame or console menus. In such an embodiment, the peripheral may be useful outside of gameplay but unsuitable for gameplay until an unlocking message is received.

In one implementation of the invention, the peripheral includes a countdown timer. After unlocking the protected inputs in response to receiving an unlocking message from the videogame software, the peripheral begins the countdown timer. The peripheral disables or re-locks the protected inputs upon expiration of the countdown timer. If and when the peripheral receives another unlocking message from the videogame software or console, however, the peripheral resets the countdown sequence and unlocks the protected inputs (if the countdown time has expired) or keeps the protected inputs in an unlocked state (if the countdown timer has not expired).

In one implementation of the invention, the unlocking message may determine the countdown timer's starting value. For example, the unlocking message may include a header and a payload. The unlocking message's payload may include the starting value to be used to set the starting value of the countdown timer (e.g., 1 millisecond, 1 second, 10 seconds, etc.). In this way, the countdown timer's starting value may be set and changed by the videogame software or console software.

In one implementation of the invention, the videogame software may periodically send unlocking messages to the peripheral. The interval at which the videogame software sends unlocking messages to the peripheral may, in some implementations, be shorter than the value of the countdown timer to help ensure the peripheral remains unlocked while the videogame software is executing.

In one implementation of the invention, the peripheral may be wirelessly coupled to the videogame console. In some embodiments, the wireless peripheral may communicate directly with wireless communications circuitry in the videogame console. Additionally or alternatively, the peripheral may wirelessly communicate with a wireless transceiver component physically coupled to the console. In some implementations, the aspects of the control circuitry relating to the protected and unprotected inputs may be found in the peripheral, the wireless transceiver component, and/or the videogame console itself.

In one implementation of the invention, the unlocking message may be cryptographically secured to prevent unauthorized access.

One implementation of the invention provides a guitar-shaped videogame peripheral, comprising: one or more protected inputs; one or more unprotected inputs; a plurality of fret buttons; a strum bar; a countdown timer; wherein enablement of the one or more protected inputs is based on receipt of an unlocking message by the guitar-shaped videogame peripheral; and wherein the one or more unprotected inputs are not disabled.

One implementation of the invention provides a system for providing a music videogame, the system comprising: a peripheral coupled to a videogame console, the peripheral comprising one or more protected inputs, one or more unprotected inputs, and a countdown timer; videogame software executing on the videogame console, the videogame console comprising one or more physical processors programmed with one or more computer program instructions which, when executed, programs the console to transmit an unlocking message to the peripheral; wherein the peripheral's one or more protected inputs are disabled until the peripheral receives the unlocking message sent by the console; wherein the one or more unprotected inputs not disabled; and wherein the unlocking message comprises a countdown value to be programmed into the countdown timer of the peripheral.

One implementation of the invention provides a method of processing videogame peripheral inputs, comprising: locking at least one protected input of the videogame peripheral, the videogame peripheral including the protected inputs and unprotected inputs which are not locked; receiving an unlocking message for the at least one protected input, the unlocking message including a value indicative of a countdown time; unlocking the at least one protected input based upon receipt of the unlocking message; starting a timer; and locking the at least one protected input upon the timer reaching a time reflective of the countdown time.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The invention relates generally to videogames, and more particularly to a system and method that prevents against the use of certain videogame peripherals with unauthorized videogame software through the use of "protected" and "unprotected" inputs.

Exemplary System Architecture

Figure 1:
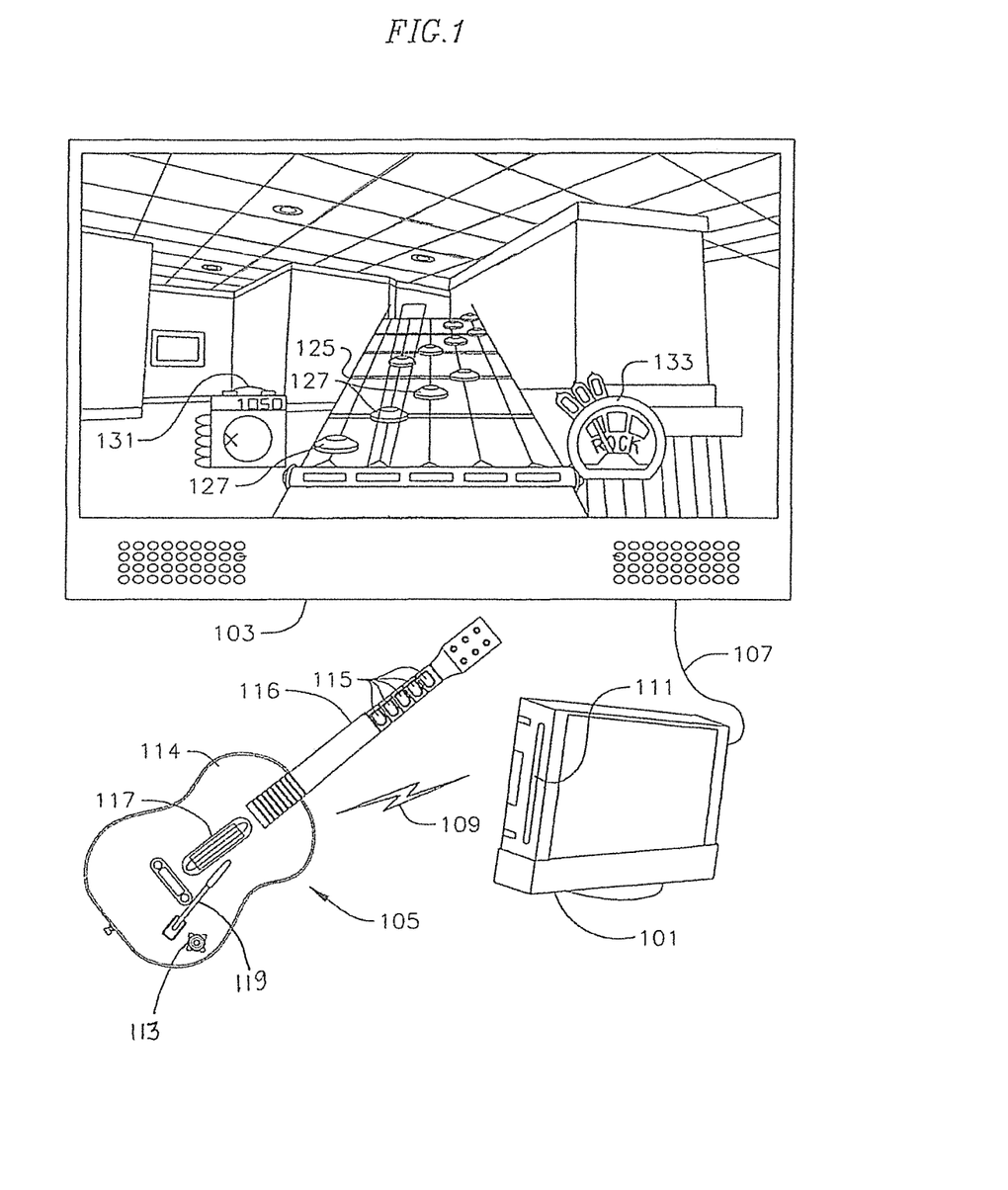
FIG. 1 illustrates an exemplary videogame system in accordance with aspects of the invention.

FIG. 1 is an example of a videogame system in accordance with aspects of the invention. In some embodiments, the videogame system includes a videogame console 101, a display unit 103, videogame software executing on the videogame console (not shown), and one or more videogame peripherals 105. The videogame console is connected to the display unit via an audio-video cable 107 and with the videogame peripherals. In the embodiment of FIG. 1, the connection between the videogame peripheral and the videogame console is a wireless connection 109. In other embodiments, the connection may be wired. The videogame console in FIG. 1 also includes one or more removable memory interfaces, for example, optical media reader 111. Though the embodiment of FIG. 1 relates to a videogame console, any device suitable for playing videogames may be used, including personal computers (e.g., desktops, laptops, etc.), handheld devices (e.g., mobile phones, tablets, etc.), smart televisions, and other computing devices.

Although not explicitly shown, the videogame console in FIG. 1 includes internal circuitry for processing instructions contained in the videogame software. The videogame console generally includes at least one processor, memory, and other circuitry, for example, graphics circuitry and interface circuitry. The videogame console also includes network circuitry for connecting to, for example, the internet, one or more servers, and/or other networked devices. Although not illustrated in FIG. 1, the videogame system may further comprise a server that may include one or more processors programmed by computer program instructions. For example, a server may include all or a portion of the videogame software and therefore provide all or a portion of the videogame instructions.

The videogame peripheral 105 of FIG. 1 is guitar-shaped, with a body 114 and a neck 116 extending from the body. The peripheral includes various inputs meant to simulate aspects of a real guitar, including for example, a strum bar 117, whammy bar 119, and a plurality of fret buttons 115. Other inputs include one or more control buttons 113. The control buttons may correspond to "start" and "select" for controlling the operation of a videogame, for example.

The inputs of the videogame peripheral are manipulated by a user of the videogame peripheral and generate input signals based on the user manipulations. The videogame console and videogame software receive the input signals generated by the videogame peripheral and processes the videogame based on the received input signals. In various combinations, the videogame console may simultaneously receive and process input signals from more than one connected videogame peripheral.

The display unit in FIG. 1 shows a screenshot of gameplay in a music videogame. The screenshot shows an interactive music track 125 with a plurality of gems, for example, gems 127, providing user instructions as to instructed user manipulation of inputs of the guitar controller during gameplay. Other features of the screenshot include, for example, a user score indicator 131 and a power meter 133.

In the music videogame of FIG. 1, the videogame console's processor(s) receive input signals from the videogame peripheral. In some embodiments, user instructions are retrieved from the removable memory source holding videogame instructions, and a visual representation of the user instructions are displayed on the display unit. A user of the videogame attempts to manipulate the videogame peripheral in compliance with the user instructions. For example, the gems may represent instructions to depress a corresponding fret button and strum the strum bar at an appropriate time (e.g., when the gem a particular part of the screen). Input signals corresponding to the user manipulations on the videogame peripheral are generated and transmitted to the videogame console. The videogame console compares the input signals for compliance with the user instructions, and determines whether the user has complied or the extent to which the user has complied with the user instructions. A score is assigned to the user based on extent of user compliance with the user instructions.

Figure 2:
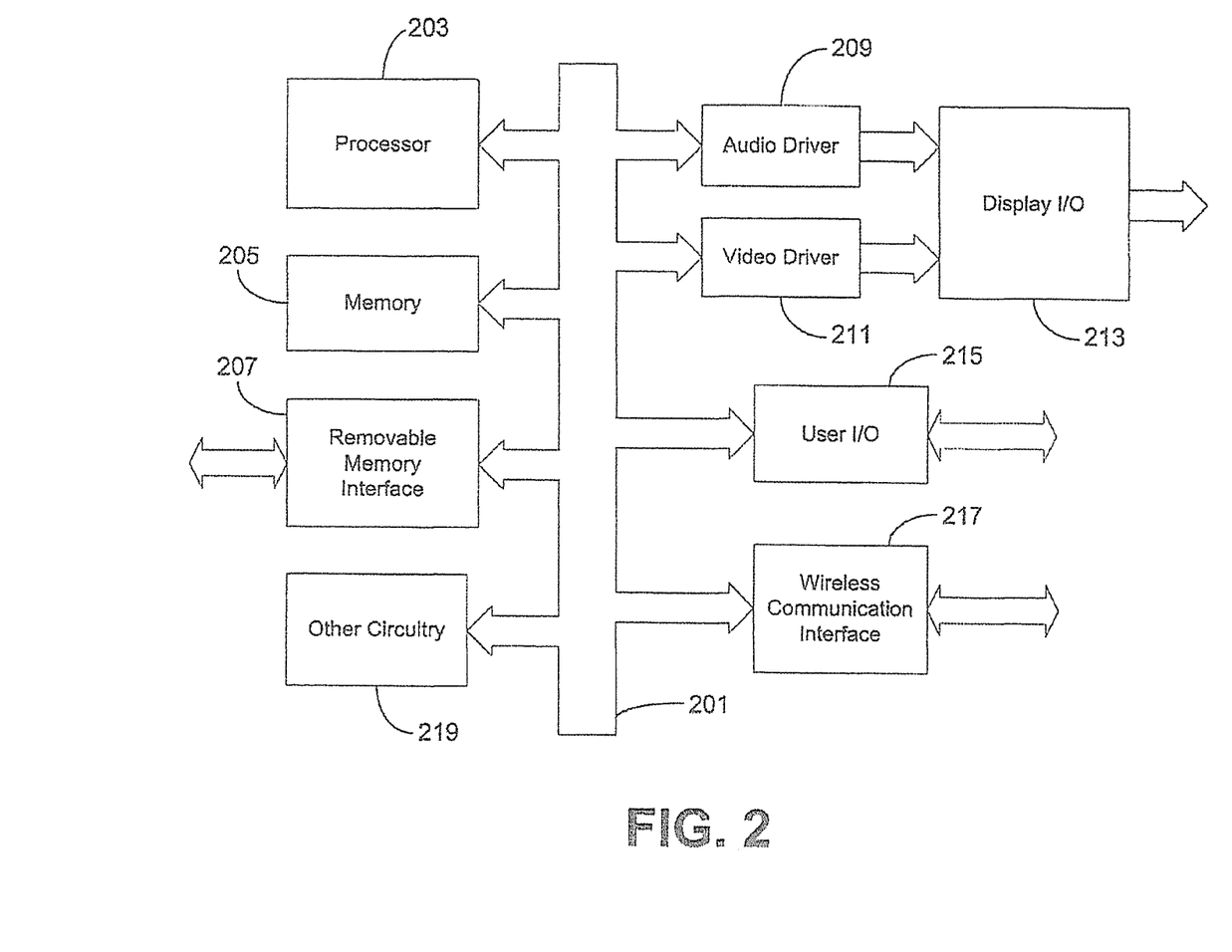
FIG. 2 illustrates an exemplary processing unit for a videogame console in accordance with aspects of the invention.

FIG. 2 is an example of a block diagram of a processing unit of a videogame console in accordance with aspects of the invention. In the embodiment of FIG. 2, the processing unit includes a bus 201 interconnecting a processor 203, memory 205, a removable memory interface 207, an audio driver 209 and a video driver 211, a display input/output port 213, a user input/output port 215, a wireless communication interface 217, and other circuitry 219 that may include, for example, networking circuitry. In various embodiments of the invention, the processing unit may include various different combinations of components to suit the particular application of each individual embodiment.

In operation, the processor executes videogame instructions to facilitate gameplay for a particular videogame. The processor may communicate with each individual component in the processing unit as needed to facilitate gameplay. In some embodiments, the processor retrieves specific instructions for a videogame from a removable memory source holding videogame software. The processor may process the videogame instructions based on general program instructions the processor retrieves from the memory.

Videogame execution is also based, in part, on input signals received from connected videogame peripheral(s), which communicate with the processor through either the user input/output port or through a wireless connection interface, as illustrated in FIG. 1. The processor processes the various instructions and input signals it receives to generate data associated with the proper execution of the videogame, for example, audio and video data related to videogame action.

In some embodiments, communication between a videogame peripheral and the videogame console's processor may be bidirectional such that the videogame peripheral may both transmit and receive communications to or from the processor. As discussed in more detail herein, communications received by the videogame peripheral from the processor may be used to implement the security protocol of the present invention.

Exemplary Peripheral Security System

Referring again to the videogame system of FIG. 1, one aspect of the invention relates to preventing the use of the videogame peripheral with unauthorized videogame software through the use of one or more protected inputs, which are disabled until unlocked. Protected inputs may be selected such that as long as the protected inputs remain disabled, a user will find it difficult, if not impossible, to successfully engage, or completely successfully engage, in the videogame's gameplay. Note that although the example of FIG. 1 depicts a music videogame using a guitar-shaped peripheral, it should be appreciated that the inventive aspects discussed herein can be applied to peripherals as used in any videogame genre or software application.

According to aspects of the invention, the videogame peripheral of FIG. 1 comprises one or more protected inputs that are disabled by default and remain disabled until unlocked, for example, when an unlocking message is received. As used herein, "input" may refer to a single input (e.g., a control button or fret button) or a plurality of inputs actuated in combination or sequence (e.g., actuating the strum bar input after or while depressing one or more fret buttons may be considered a specific "input"). In some embodiments, a protected input may include a single (or plural) input(s) that are disabled based on status of another input (e.g. the strum bar input is disabled when one or more fret buttons are in a depressed state). In one embodiment, the peripheral includes circuitry, which in some embodiments is a processor, for example programmed by program instructions, to disable the protected inputs by not generating signals to the videogame console in response to the user actuating the protected inputs. In another embodiment, the signals may be generated but masked by circuitry in the videogame console, a wireless transceiver coupled to the console, and/or the peripheral itself to achieve the same effect. It should be appreciated that there are other ways to disable a protected input, any of which may be implemented within the scope of this invention.

In some embodiments, the protected inputs are a subset of the peripheral's inputs (i.e., the protected inputs do not include all of the peripheral's inputs). In other embodiments, the protected inputs are specific sequences and/or combinations of inputs. In such cases, the peripheral may further comprise one or more unprotected inputs that are enabled by default and do not need to be unlocked for use.

According to aspects of the invention, inputs can be classified as being useful only within gameplay, being useful only outside of gameplay (e.g., to navigate videogame menus or console menus), or useful both within and outside of gameplay. In some embodiments, the protected inputs may comprise one or more inputs useful only within gameplay, while the unprotected inputs comprise one or more inputs only useful outside of gameplay or useful within and outside of gameplay. In the example of FIG. 1, protected inputs may include certain button combinations only used during gameplay, for example, the button combination of actuating the strum bar input while pressing one or more fret buttons (here referred to as a "chord" input) or certain individual inputs such as the whammy bar. Unprotected inputs may include, for example, inputs useful in navigating menus outside of gameplay (e.g., the strum bar, certain fret buttons, the start/select buttons, and other inputs may be used to navigate in-game menus, the console's system menus, virtual stores, or other applications). In such embodiments, the videogame system disclosed herein allows the user to use the videogame peripheral outside of gameplay, while preventing meaningful use of the videogame peripheral within gameplay by disabling certain inputs needed for gameplay. The scheme of selecting of protected and unprotected inputs on whether the inputs are useful within or outside of gameplay is one example of how to group protected and unprotected inputs, and other schemes may be used. For example, the protected and unprotected inputs may correspond to their usefulness during certain game modes or in particular sections of the game.

According to aspects of the invention, the protected inputs are disabled until unlocked. In some embodiments, the protected inputs are unlocked when the peripheral receives from the videogame software or console an unlocking message. In some embodiments, all protected inputs may be unlocked by a single unlocking message, though in other embodiments, different unlocking messages may be required to unlock different protected inputs.

Figure 3:
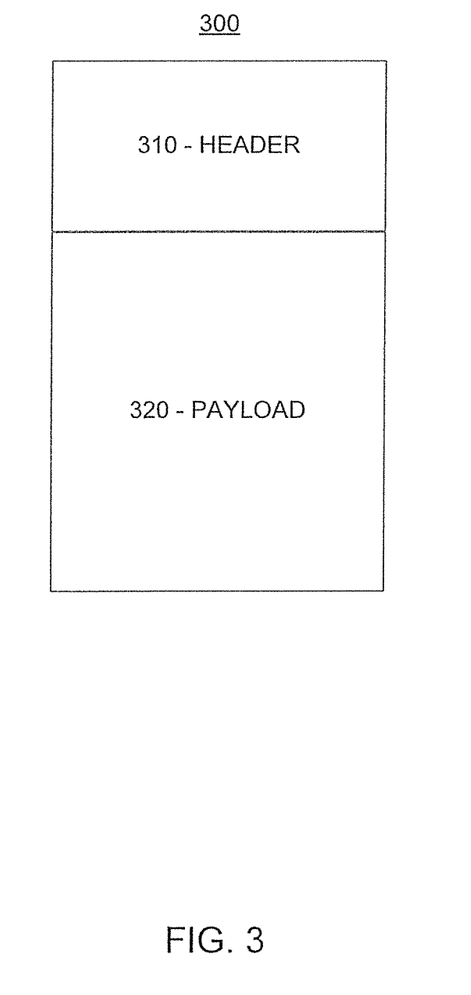
FIG. 3 illustrates an exemplary unlocking message in accordance with aspects of the invention.

FIG. 3 illustrates an unlocking message 300 in accordance with aspects of the invention. Unlocking message 300 may be transmitted by software being executed on the videogame console including, for example, the console's system software or videogame software executing on the console. Unlocking message 300 may comprise, for example, a header/control portion 310 and a payload/data portion 320. The header portion may, in some embodiments, comprise information identifying the message as an unlocking message. The payload portion, in some embodiments, may comprise information identifying one or more protected inputs to be unlocked.

In some embodiments, the videogame peripheral includes one or more countdown timers. After unlocking one or more protected inputs, for example, in response to receiving an unlocking message, the videogame peripheral initiates the countdown timer. The videogame peripheral disables (or "re-locks") the unlocked protected inputs upon expiration of the countdown timer. If, however, the videogame peripheral receives another unlocking message before the countdown timer's expiration, the videogame peripheral resets the countdown timer and the protected inputs remain unlocked. In some embodiments, aspects of the control circuitry relating to the protected and unprotected inputs may be found in the console, the wireless transceiver coupled to the console, and/or the peripheral itself. In some embodiments, the protected inputs may be unlocked by default, but locked after no unlocking message is received before the countdown timer's expiration.

In some embodiments, the unlocking message may contain data representing the countdown timer's starting value (or "countdown value"). For example, the unlocking message's payload may include the starting value to be programmed into the countdown timer (e.g., millisecond, 1 second, 10 seconds, etc.). The countdown timer's starting value may thus be set or changed by the software sending the unlocking messages (e.g., videogame software or console software). In some embodiments, the unlocking messages are sent periodically at specific intervals, and the countdown value may be a function of the interval for sending unlocking messages. For example, the countdown value may be ten (or any other factor) times the interval for sending unlocking messages. In that example, if unlocking messages are sent every one second, the countdown value would be ten seconds. As another example, the interval for sending unlocking messages may be a certain number of seconds greater than the countdown value (e.g., countdown value+X seconds). Utilizing a countdown value greater than the interval for sending unlocking messages, helps mitigate against unsuccessfully delivered unlocking messages (e.g., those that were dropped due to an unreliable connection between the console and peripheral).

In one implementation of the invention, the unlocking message may be cryptographically secured to prevent unauthorized access. For example, the unlocking message may be encrypted or scrambled amongst other messages. In some embodiments, a 2-way handshake may be required between the console and peripheral before unlocking messages are sent.

Exemplary Flowcharts

Figure 4:
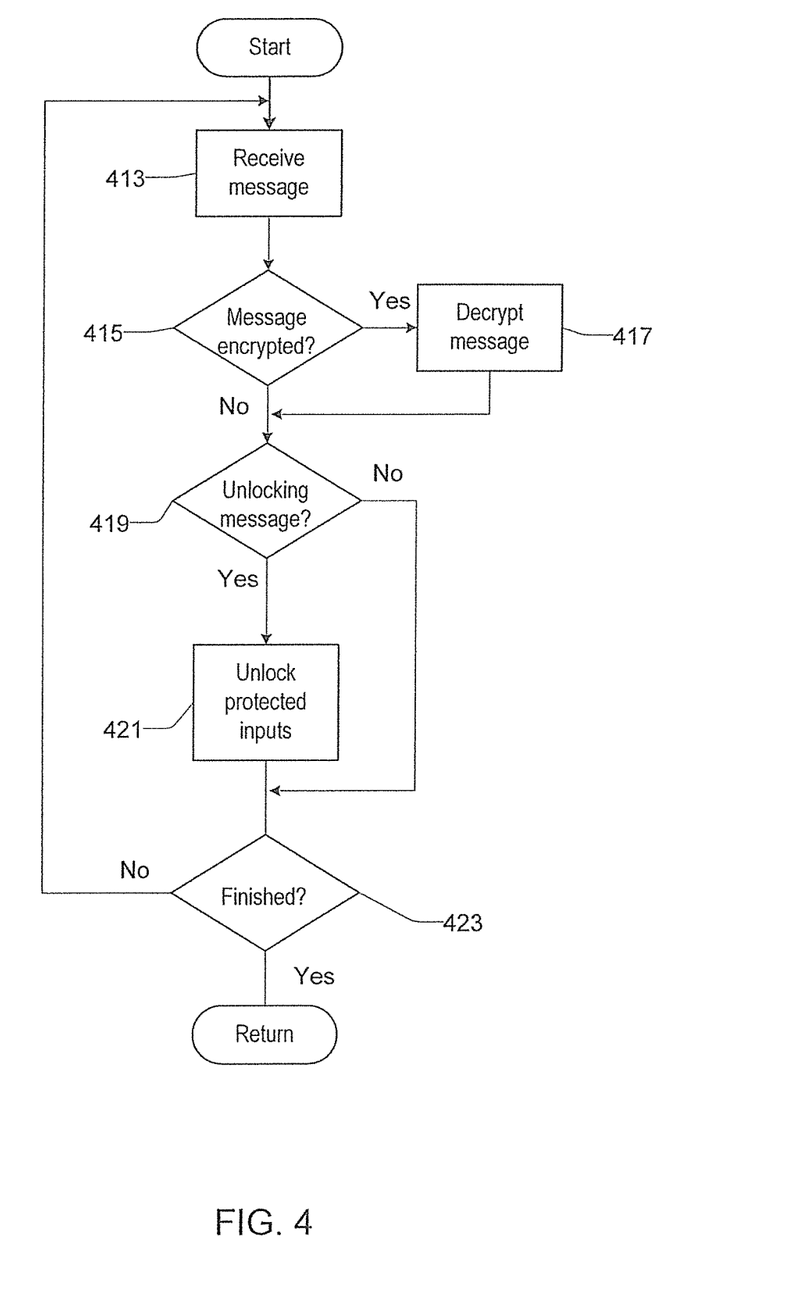
FIG. 4 depicts an exemplary process for unlocking protected inputs in accordance with aspects of the invention.
Figure 5:
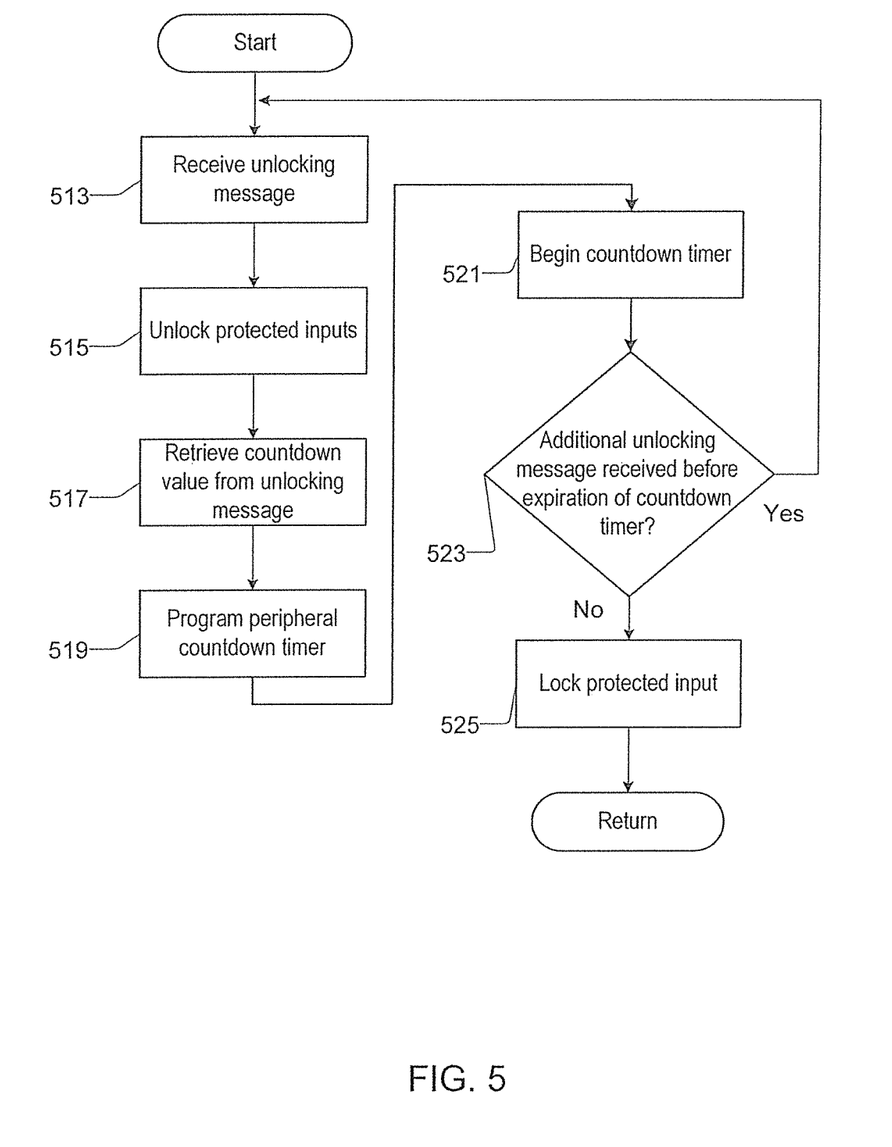
FIG. 5 depicts an exemplary process for unlocking and re-locking protected inputs in accordance with aspects of the invention.

The various processing operations and/or data flows depicted in the exemplary flowcharts of FIGS. 4 and 5 are described in greater detail herein. The described operations may be accomplished using some or all of the system components described in detail above and, in some implementations, various operations may be performed in different sequences and various operations may be omitted. In some embodiments operations of the processes of FIG. 4 and/or FIG. 5 are performed by circuitry of a videogame peripheral, for example the videogame peripheral of FIG. 1. In some embodiments the circuitry comprises a processor, which in some embodiments is programmed by program instructions. In some embodiments operations of processes of FIG. 4 and/or FIG. 5 are performed by circuitry of a videogame console, for example the videogame console of FIG. 1 and/or the processing unit of FIG. 2. In some embodiments the operations of FIG. 4 and/or FIG. 5 are performed by a videogame peripheral and a videogame console acting in concert. In some embodiments, additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Exemplary Process for Unlocking Protected Inputs

FIG. 4 depicts an exemplary process for unlocking protected inputs according to aspects of the invention.

In an operation 413, the process receives a message. The message could, for example, be sent by software running on a videogame console (e.g., videogame software or console system software) and received by a videogame peripheral coupled to the videogame console.

In an operation 415, the process determines whether the received message is encrypted. If so, the process decrypts the message in an operation 417 and proceeds to an operation 419. If not the process proceeds directly to an operation 419. In some embodiments in which no encryption is utilized, the process skips operation 415 altogether and proceeds directly to an operation 419.

In an operation 419 the process determines if the message is an unlocking message. In some embodiments, the message type may be encoded in the message header, as described in connection with FIG. 3. If the message is an unlocking message, the process proceeds to an operation 421 and unlocks one or more protected inputs. In some instances, the process unlocks all protected inputs in response to receiving an unlocking message. In other embodiments, the message's payload may contain information relating to which of a plurality of protected inputs should be unlocked. Once the designated protected inputs have been unlocked, the process proceeds to an operation 423, where the process either returns to an operation 413 or finishes.

Exemplary Process for Unlocking and Locking Protected Inputs

FIG. 5 depicts an exemplary process for unlocking and locking protected inputs according to an implementation of the invention.

In operations 513 and 515, the process receives an unlocking message and unlocks one or more protected inputs. The receiving of an unlocking message and unlocking operations may be similar to those described in connection with FIG. 4, above.

In an operation 517, the process retrieves from the unlocking message's payload a countdown value.

In an operation 519, the videogame peripheral's countdown timer is set to the countdown value obtained from the unlocking message.

In an operation 521, the countdown timer begins.

In an operation 523, the process determines if an additional unlocking message has been received before the expiration of the countdown timer. If the countdown timer expired before an additional unlocking message is received, the process proceeds to an operation 525, in which the one or more protected inputs previously unlocked in operation 515 are again locked by the process. On the other hand, if an additional unlocking message is received before the countdown timer's expiration, the process proceeds to an operation 513 and repeats the process of receiving an unlocking message, unlocking one or more protected inputs, and programming the videogame peripheral's countdown timer with the unlocking message's countdown value.

As discussed above, the countdown value can be representative of any time value (e.g., 100 millisecond, 1 second, 1 minute, etc.), and in some embodiments, is a function of the interval for sending unlocking messages. For example, the countdown value may be the interval for sending unlocking messages multiplied by some factor (e.g., 10, 50, 100). In this manner, the console will send multiple unlocking messages before the countdown timer expires. Additionally or alternatively, the countdown timer may be dynamically adjusted. If, for example, it is determined that unlocking messages sent from the console to the peripheral are being dropped due to an unreliable coupling between the console and peripheral, the software sending the unlocking messages may increase the value of the countdown timer to allow more unlocking messages to be sent before the countdown timer expires.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for providing a music videogame, the system comprising:
    a peripheral coupled to a videogame console, the peripheral comprising one or more protected inputs, one or more unprotected inputs, and a countdown timer;
    videogame software executing on the videogame console, the videogame console comprising one or more physical processors programmed with one or more computer program instructions which, when executed, programs the console to transmit an unlocking message to the peripheral;
    wherein the peripheral's one or more protected inputs are disabled until the peripheral receives the unlocking message sent by the console and are enabled in response to receiving the unlocking message;
    wherein the protected inputs are combinations of inputs of the peripheral;
    wherein the one or more unprotected inputs are not disabled; and
    wherein the unlocking message comprises a countdown value to be programmed into the countdown timer of the peripheral.

2. A method of processing videogame peripheral inputs, comprising:
    locking at least one protected input of the videogame peripheral, the videogame peripheral including the at least one protected input and unprotected inputs which are not locked, the protected input being a combination of inputs of the videogame peripheral;
    receiving, in the videogame peripheral, an unlocking message for the at least one protected input, the unlocking message including a value indicative of a countdown time;
    unlocking the at least one protected input based upon receipt of the unlocking message;
    starting a timer of the videogame peripheral; and
    locking the at least one protected input upon the timer reaching a time reflective of the countdown time.

3. The method of claim 2, further comprising resetting the timer upon receiving a further unlocking message in the videogame peripheral.

4. The method of claim 2, wherein the videogame peripheral is a guitar-shaped videogame peripheral for music-based video game.

5. The method of claim 4, wherein the videogame peripheral includes a strum bar input and fret button inputs.

6. The method of claim 5, wherein the at least one protected input comprises a plurality of protected inputs, each of the plurality of protected inputs including a strum bar input and one or more fret button inputs actuated in combination.

7. The method of claim 2 wherein locking the at least one protected input is performed by circuitry of the videogame peripheral.

8. The method of claim 7, wherein the circuitry of the videogame peripheral comprises a processor.

* * * * *